(12) United States Patent
Lim et al.

(10) Patent No.: US 9,124,455 B1
(45) Date of Patent: Sep. 1, 2015

(54) LINK EQUALIZATION MECHANISM

(71) Applicant: INTEL CORPORATION, Santa Clara, CA (US)

(72) Inventors: Su Wei Lim, Klang (MY); Ronald W. Swartz, Granite Bay, CA (US); Yueming Jiang, Rancho Cordova, CA (US); Hooi Kar Loo, Bayan Lepas (MY); Athourina Gevergiz, San Jose, CA (US); Bruce A. Tennant, Hillsboro, OR (US); Yick Yaw Ho, Folsom, CA (US); Poh Thiam Teoh, Seri Damansara (MY); Jennifer Chin, Sungai Ara (MY); Hui Shi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/495,768

(22) Filed: Sep. 24, 2014

(51) Int. Cl.
*H03H 7/30* (2006.01)
*H04L 25/03* (2006.01)

(52) U.S. Cl.
CPC ................................ *H04L 25/03006* (2013.01)

(58) Field of Classification Search
CPC ....... H04L 1/0001; H04L 1/24; H04L 5/1438; H04L 25/03006; H04L 25/03057; H04L 1/0002; H04L 25/085; H04L 27/01; H04L 2025/03592; H04L 25/03885; H04B 3/46; H04B 1/1027; H04B 1/00; H04M 3/2209; H04M 3/2227
USPC .......................................... 375/232–236, 350
See application file for complete search history.

(56) References Cited

U.S. PATENT DOCUMENTS

| | | | |
|---|---|---|---|
| 2007/0217526 A1* | 9/2007 | Park et al. ...................... | 375/260 |
| 2009/0219978 A1* | 9/2009 | Mobin et al. ................... | 375/219 |
| 2014/0092952 A1* | 4/2014 | Aguilar-Arreola et al. ... | 375/233 |

* cited by examiner

*Primary Examiner* — Don N Vo
(74) *Attorney, Agent, or Firm* — International IP Law Group, P.L.L.C.

(57) ABSTRACT

Techniques for embedded high speed serial interface methods are described herein. The techniques provide an apparatus for link equalization including an equalization control module to determine at least a first coefficient setting and a second coefficient setting at a remote transmitter based on an algorithm. The apparatus also includes a receiver margining module to determine a first margin value to be associated with the first coefficient setting and a second margin value to be associated with the second coefficient setting. The receiver margining module is to further determine if at least the first margin value is higher than the second margin value.

25 Claims, 14 Drawing Sheets

100

400

500

500

600

700

LINK EQUALIZATION MECHANISM

TECHNICAL FIELD

This disclosure relates generally to techniques equalization of transmission signals. More specifically, this disclosure relates to transmission signal equalization based on margining techniques.

BACKGROUND

In some computing devices, a transmitted signal may be received at a receiver via a transmission link. Intersybmol interference (ISI) may cause distortion of a transmitted signal wherein one symbol may interfere with subsequent symbols. For example, various amplitudes may be received on a receiving end dependent upon a data pattern of the transmitted signal wherein each bit may be allotted a fixed amount of bit time. However, the more that data being transmitted transitions from a high voltage "1" bit indicator to a low voltage "0" bit indicator, or vise versa, the more an amplitude will vary at a receiving end of the transmission link. In some cases, link training may be performed to reduce ISI. For example, in the Peripheral Component Interconnect Express Revision 3.0, Nov. 10, 2010 (PCIe 3) specification, link training includes a link equalization procedure wherein transmitter and receiver setups are adjusted to improve signal quality. However, it is a challenge to the perform equalization via hardware autonomous mechanisms.

BRIEF DESCRIPTION OF THE DRAWINGS

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

In the aspects discussed below, techniques for equalization of a transmission link are described. As discussed above, ISI may cause distortion in a transmitted signal between computing device component and a peripheral computing device component. However, the techniques described herein include an apparatus, such as a receiver, to receive transmitted signals and determine a margin value based on eye margining techniques. In eye margining, a larger margin value may indicate less distortion in a received signal. A transmitter equalization module of the receiver is configured to change a coefficient setting at a remote transmitter based on an algorithm. For example, the transmitter equalization is to change at least a first and a second coefficient setting at the remote transmitter. The value of each coefficient setting depends on the algorithm used.

A change in coefficient setting is associated with a change in amplitude of the transmitted signal. Therefore, a change in a coefficient setting may result in a change in margin values for that setting. A margin value may be determined for each change, and a margin value that is highest among the margin values determined is identified. A coefficient associated with the highest margin value may be selected as a final coefficient setting for the transmitter.

Figure 1:
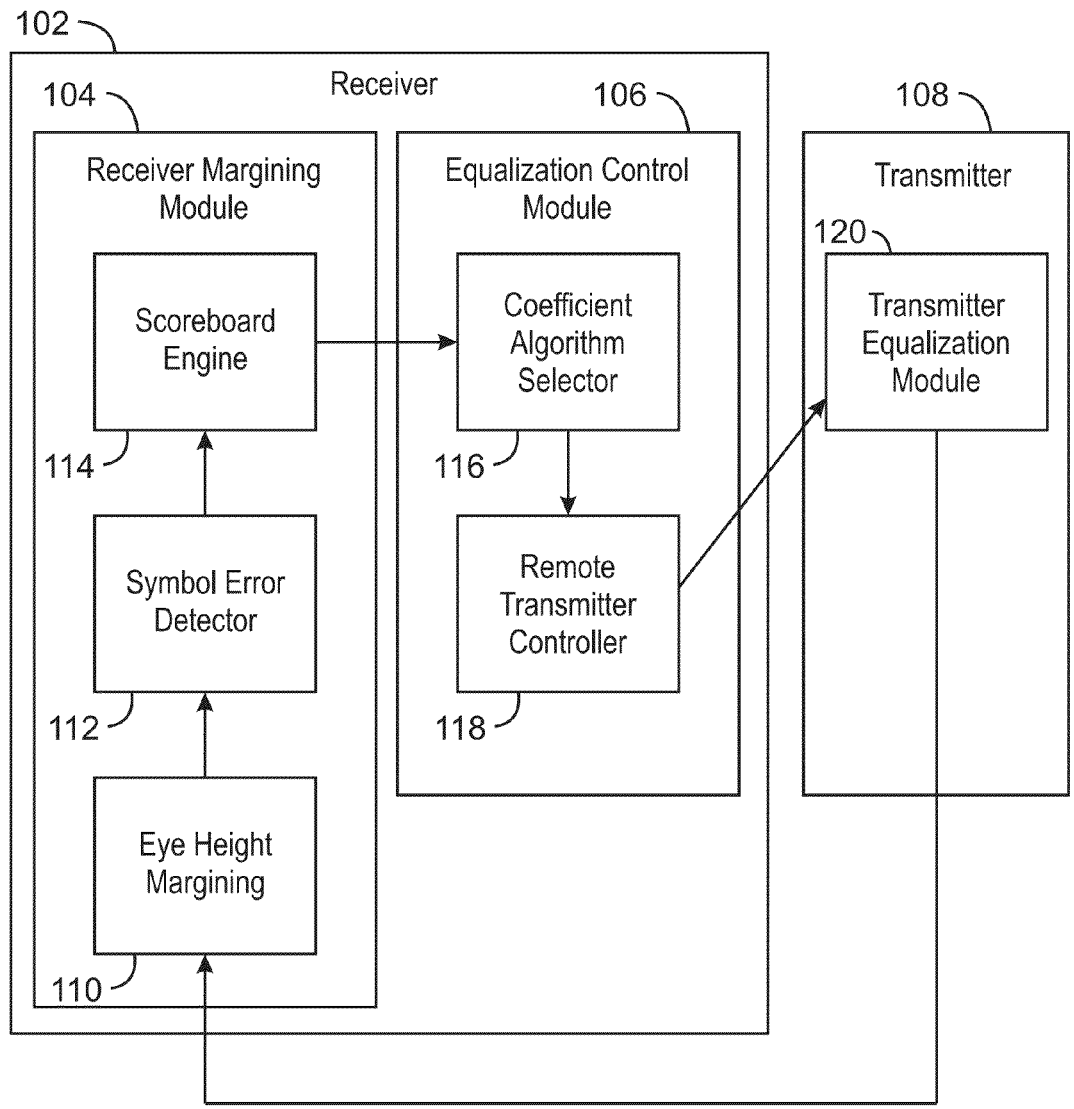
FIG. 1 illustrates a block diagram of a computing system for link equalization.

FIG. 1 illustrates a block diagram of a computing system for link equalization. The computing system 100 includes a receiver 102 including a receiver margining module 104 and an equalization control module 106. As illustrating in FIG. 1, the receiver 102 is communicatively coupled to a transmitter 108. The communicative coupling between the receiver 102 and the transmitter 108 may be referred to herein as a transmission link. The transmission link may, in some cases, be a Peripheral Component Interconnect Express (PCIe) fabric, although other connector types may be implemented.

The equalization control module 106 is configured to successively change a coefficient setting at the transmitter 108. In other words, the equalization control module 106 is configured to remotely alter settings at a remote device, such as the transmitter 108. The successive change in the remote transmitter coefficient setting is based on an algorithm. Although discussed in more detail below, the algorithm may include a linear preset coefficient search, a mid-range coefficient search, a nine tile coefficient search, a grid with surrounding box search, or any combination thereof. The algorithms may be used in conjunction with the receiver margining module 104 to equalize the transmission link between the receiver 102 and the transmitter 108.

Specifically, as the receiver margining module 104 may include an eye height margining mechanism 110, a symbol error detector 12, and a scoreboard engine 114. As the equalization control module 106 is changing the coefficient settings of the transmitter 108, the receiver margining module 104 is configured to determine a margin for each successive coefficient setting by directing the eye height margining mechanism 110 to increase an offset until a bit error rate (BER) exceeding a threshold is detected at the symbol error detector 112. The scoreboard engine 114 is configured to record the offset value, or margin value as referred to herein, at which the BER exceeded the threshold. The receiver margining module 104 is to identify a value that is highest from among the margin values determined. The receiver margining module 104 is further configured to identify the coefficient associated with the highest margin value, and the equalization control module 106 is configured to finalize the coefficient setting at the remote transmitter 108 based on the coefficient associated with the highest margin value.

The equalization control module 106 may include submodules such as a coefficient algorithm selector 116 and a remote transmitter controller 118. The coefficient algorithm selector 116 may be programmable such that a user may determine which algorithm to use. In some cases, the algorithm selected may be based on an advertisement of the transmitter 108 indicating features of the transmitter. The remote transmitter controller 118 is configured to change the settings at the transmitter 108. The transmitter 108 may also include its own mechanism for equalization, such as the transmitter equalization module 120 illustrated in FIG. 1. Therefore, while the transmitter 108 may be configured to equalize signal independent from input of the receiver, equalization may be improved by the cooperative approach including the transmitter 108 and the receiver 102 described herein.

Figure 2:
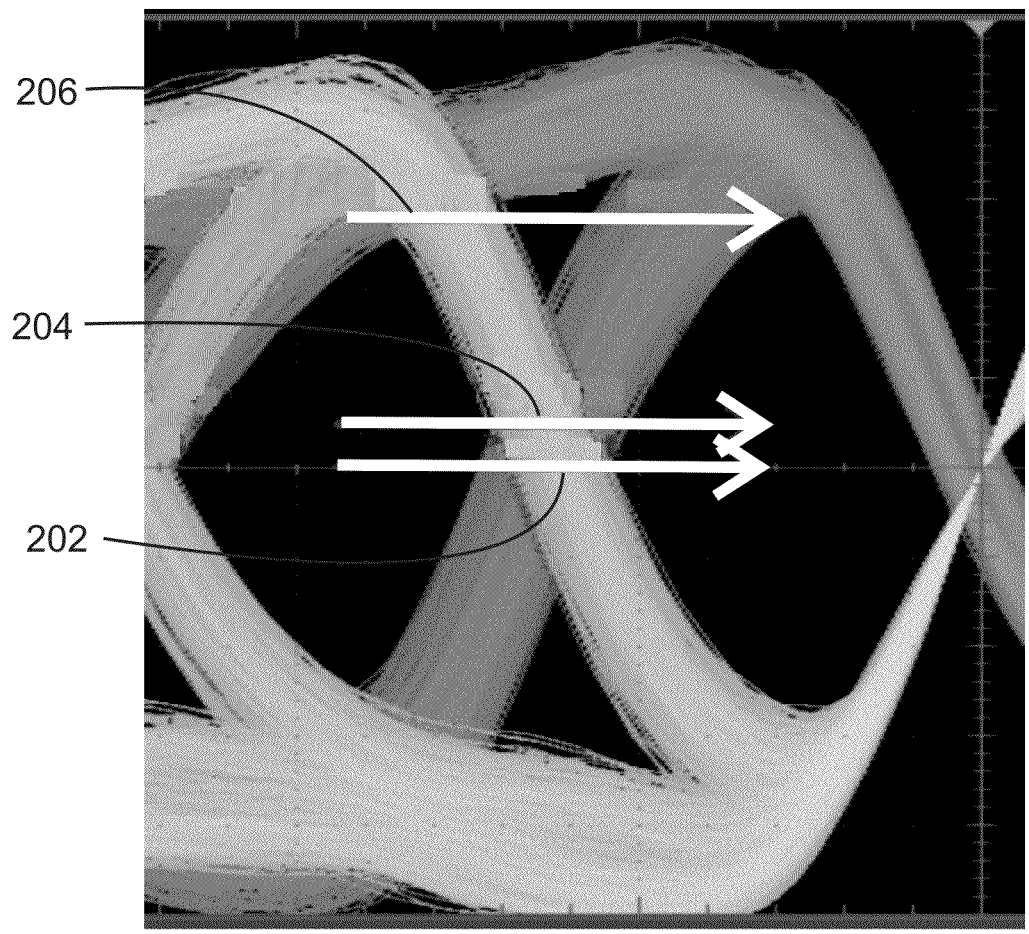
FIG. 2 is a signaling diagram illustrating an eye margining technique.

FIG. 2 is a signaling diagram illustrating an eye margining technique. The signaling diagram of FIG. 2 illustrates an initial sampling point 202, a first sampling point offset 204, and a sampling point offset N 206. A receiver margining module, such as the receiver margining module 104 of FIG. 1 discussed above, may include the eye height margining mechanism 110 configured to increase a voltage offset.

As illustrated in FIG. 2, the increase may be between sampling points, such as the initial sampling point 202, the first sampling point offset 204, successively until sampling point offset N 206 is reached. As the sampling point offsets are increased, the potential for an ISI associated with a given signal may also increase. Sample point offset N is defined as a sampling point offset wherein ISI causes a bit error rate (BER) at, or above, a predetermined threshold. The distance between the initial sampling point 202 and the sampling point N is a margin value, such as the margin value discussed above in regard to FIG. 1. Each successive coefficient will be evaluated to determine a margin value to be stored at the scoreboard engine 114, and a coefficient associated with the highest margin value may be selected as an final coefficient setting at the transmitter 108, at least among the coefficients evaluated based on a given algorithm determining a coefficient set, discussed in more detail below.

The eye margining technique described above may enable real time on-die receiver eye margining characterization by eye height characterization. These techniques may be implemented in a number of different link technologies. For example, during link equalization training process of a PCIe embodiment scrambled training sequences that have multiple frequency components may be sent consistently. The techniques described herein include a component, such as the receiver 102 of FIG. 1, that can train an equalizer and allow Clock-Data-Recovery to position the clock at its steady state position, or sampling point 202 discussed above in regard to FIG. 2. A programmable timer (not shown) mechanism may be used to increase the sampling point's offset voltage step by step towards the edge of the eye diagram. Received symbols may be compared to ordered sets, or otherwise known data based on implementing a pseudo-scrambling technique, wherein the scrambling performed includes at least some bounding. Bit errors are reported when a mismatch occurs.

The increase of a voltage offset may be referred to herein as eye height margining. In some cases, the offset may be a timing offset, wherein the steps may be an increase in timing for each sample. This may be referred to herein as eye width margining.

Figure 3:
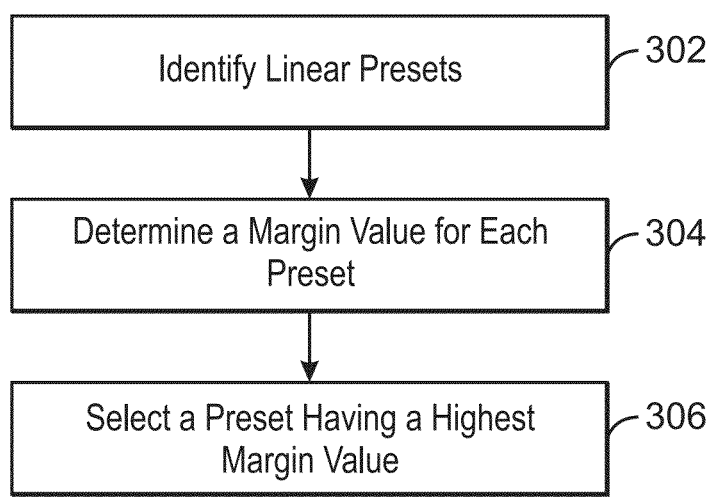
FIG. 3 is a block diagram illustrating a method for determining a coefficient based on a margin value according to a linear preset coefficient search algorithm.

FIG. 3 is a block diagram illustrating a method for determining a coefficient based on a margin value according to a linear preset coefficient search algorithm. As discussed above, the number and value of coefficients that are evaluated may be dependent on the algorithm used to determine a coefficient set.

In one embodiment, linear presets may be identified at 302 based on empirical lab measurement or pre-silicon analysis. In some cases, the linear presets are derived based on processes associated with a standards specification, such as the PCIe 3 standards specification discussed above. In any case, each of the linear presets is used to alter the transmitter 108, and a resulting signal at the receiver 102 may be evaluated to determine a margin value. The margin value is recorded indicating the distance from an initial sampling point, such as the initial sampling point 202, and a sampling point associated with a threshold above a predetermined threshold, such as sampling point offset N 206 discussed above in regard to FIG. 3.

The highest margin value may be determined and at 306 a preset coefficient associated with the highest margin value is selected. The method 300 may include additional steps such as setting a transmitter, such as the transmitter 108 of FIG. 1, to use the coefficient associated with the highest margin value. In the event that more than one preset coefficient is associated with a BER that is substantially the same, a preset coefficient may be selected based on a descending order of the preset coefficients. For example, the PCIe 3 standards specification may define a descending order for the present coefficients, and in the case of a tie, the top preset coefficient may be selected as the final transmitter setting.

In some cases, the method discussed above may be referred to as a linear preset search. The linear preset search may use silicon characterization to determine preset coefficients based on a given receiver, such as the receiver 102, formed in a silicon design. Further, in some scenarios, the linear preset coefficient search may not select a preset coefficient that presents the highest margin value at the receiver 108, in view of previously performed silicon analysis. However, in this scenario, a set of ten coefficients may be programmed into programmable registers associated with the receiver 108. The coefficients may be programmed into the registers based on a Full Swing (FS) step size of 64 steps. In the PCIe 3 standards specification, a maximum FS step size may be 63 steps. For simplification, the step size may initially be 64 steps, and may be converted to a FS step size of 63 steps if the transmitter 108 supports the FS step size of 63 steps. In other words, hardware, such as equalization control module 106, may automatically convert the coefficients to the step size of the transmitter 108 before presenting the coefficients to the transmitter 108. The conversion may be illustrated by Eq. 1 below:

$$\text{Coefficient Transmit} = \left(\frac{\text{Linear Coefficient List}}{\text{Step Size 64}}\right) \times \text{Remote Device Full Swing Range} \quad \text{Eq. 1}$$

The remote device, such as the transmitter 108, may have a swing range of 24-63 step sizes. If the programmed coefficients are beyond a support range of the remote transmitter 108, such as FS/low frequency (LF), hardware will automatically scale the coefficients.

For example, hardware, such as the equalization control module 104, may first test a post-cursor with a PCIe 3 standard specification coefficient rule, indicated in Equation 1 below:

$$C_0 - |C_{-1}| - |C_{+1}| > LF \qquad \text{Eq. 1}$$

In Eq. 1, $C_0$ is the coefficient of interest, while $C_{-1}$ is the coefficient coming before $C_0$, and $C_{+1}$ is the coefficient coming after $C_0$. The coefficient $C_{-1}$ coming before $C_0$ may be referred to herein as a precursor coefficient, while the coefficient $C_{+1}$ coming after $C_0$ may be referred to herein as a post-cursor coefficient. If the post-cursor is out of range in view of Eq. 1, the equalization control module 104 may scale the post-cursor such that the post-cursor is compliant with Eq. 1 and Equation 2 below:

$$|C_{-1}| = 0 \qquad \text{Eq. 2}$$

This will push the post-cursor to a right corner of an area bounded by three coefficient rules according the PCIe 3 standard specification. Specifically, the three coefficient rules may be characterized by Eq. 1 above, and Equations 4 and 5 below. The equalization control module 104 may then test the precursor with Eq. 1. If the precursor is out of range, the precursor value is replaced with Equation 3 below:

$$|C_{+1}| = 0 \qquad \text{Eq. 3}$$

Subsequently the precursor is checked with Equation 4 below:

$$|C_{-1}| \le \text{Floor}\left(\frac{FS}{4}\right) \qquad \text{Eq. 4}$$

If the precursor fails to comply with Eq. 4, then the precursor value will be replaced with the new value, i.e., Floor*(FS/4). This will effectively push the precursor value upwards to an area bounded by the three rules. The area bounded by the three rules may be referred to herein as a Boost Line.

The cursor of the coefficient of interest may be determined based on scaled precursor and scaled post-cursor through Equation 5 below:

$$|C_{-1}| + C_0 + |C_{+1}| = 1 \qquad \text{Eq. 5}$$

The linear preset coefficient search results may use a preset coefficients programmable register as illustrated by Table 1 below:

TABLE 1

| Register List | Presets Mode | Coefficients Mode |
|---|---|---|
| Linear List 0 | $1^{st}$ preset | $1^{st}$ coefficient |
| Linear List 1 | $2^{nd}$ preset | $2^{nd}$ coefficient |
| Linear List 2 | $3^{rd}$ preset | $3^{rd}$ coefficient |
| Linear List 3 | $4^{th}$ preset | $4^{th}$ coefficient |
| Linear List 4 | $5^{th}$ preset | $5^{th}$ coefficient |
| Linear List 5 | $6^{th}$ preset | $6^{th}$ coefficient |
| Linear List 6 | $7^{th}$ preset | $7^{th}$ coefficient |
| Linear List 7 | $8^{th}$ preset | $8^{th}$ coefficient |
| Linear List 8 | $9^{th}$ preset | $9^{th}$ coefficient |
| Linear List 9 | $10^{th}$ preset | $10^{th}$ coefficient |
| Linear List 10 | $11^{th}$ preset | |

Figure 4A:
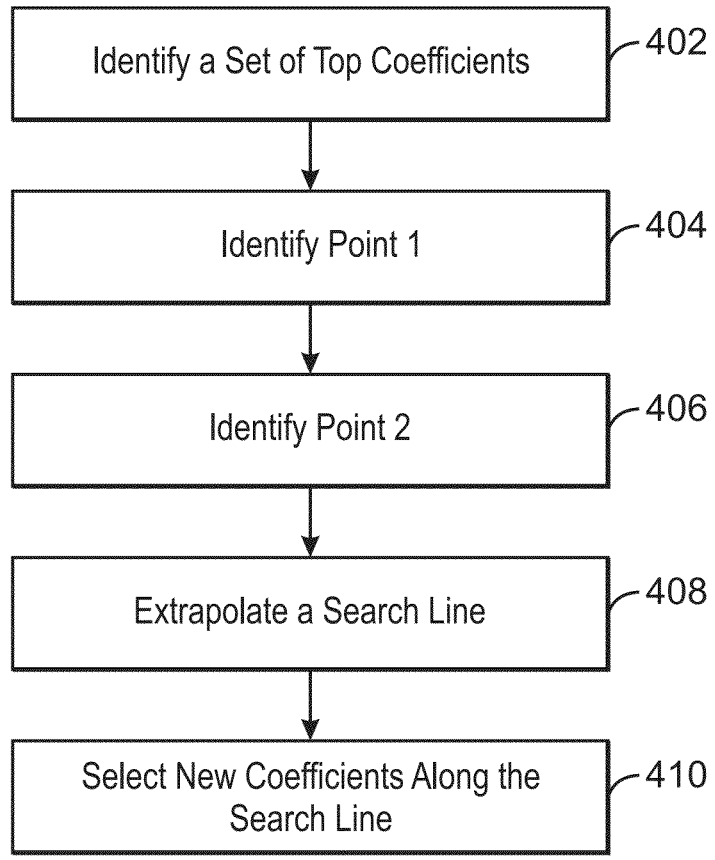
FIG. 4A is a block diagram illustrating a method for determining a coefficient for link equalization based on a mid-range coefficient search algorithm.

FIG. 4A is a block diagram illustrating a method for determining a coefficient for link equalization based on a mid-range coefficient search algorithm. At 402, a set of top coefficients are identified from the linear preset coefficient search discussed above in regard to FIG. 3. For example, four coefficients having the highest margin values may be selected from the linear preset coefficient search.

At 404, a coefficient having a largest precursor and a smallest post-cursor is identified as point 1. At 406, a coefficient having a smallest precursor and a largest post-cursor will be identified as point 2. A search line is extrapolated at block 408 based on point 1 and point 2. Seven points are selected along this line as new coefficients for searching, at block 410.

Figure 4B:
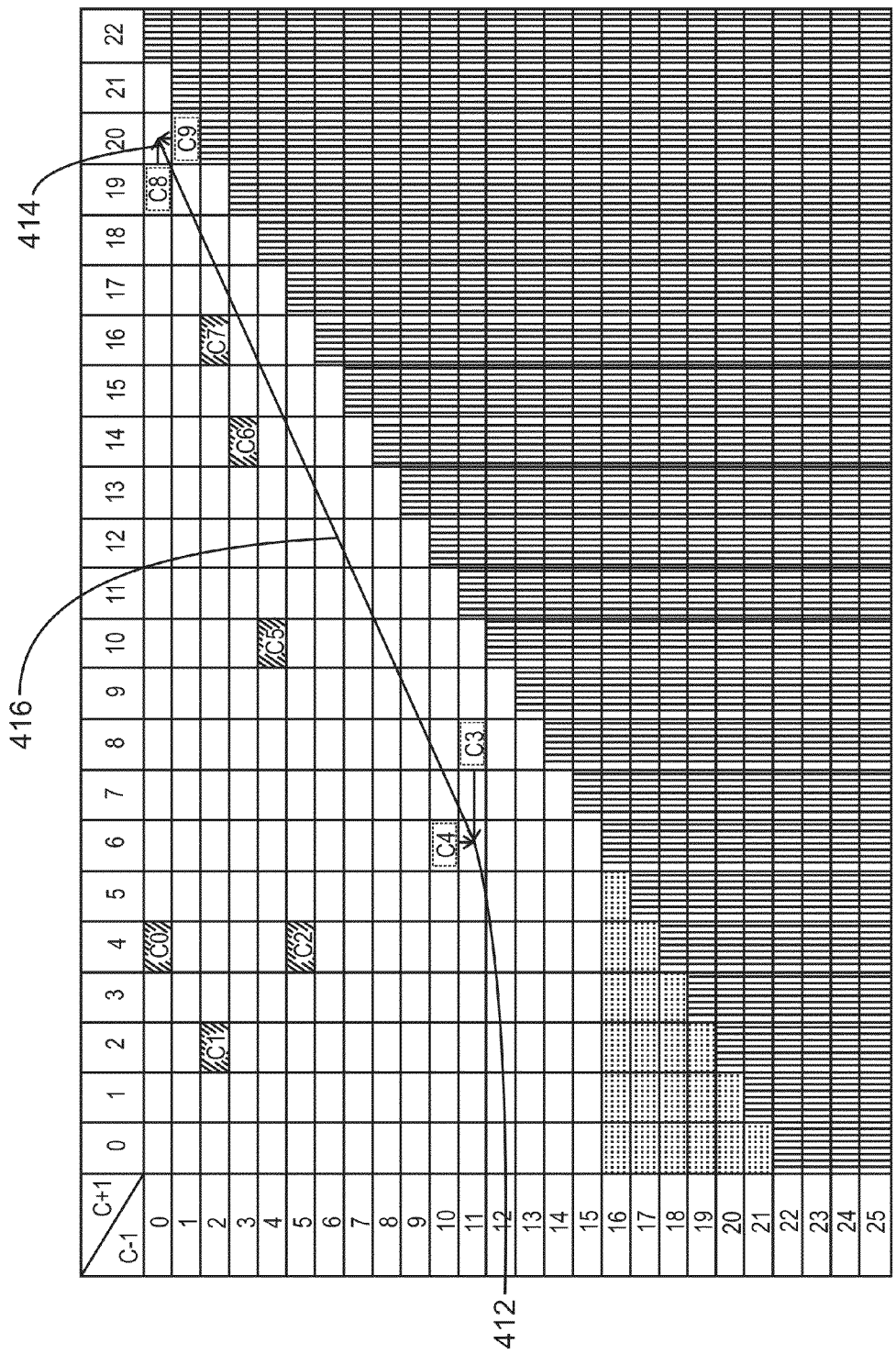
FIG. 4B is a graph illustrating a population of coefficients for link equalization based on the mid-range coefficient search algorithm.

FIG. 4B is a graph illustrating a population of coefficients for link equalization based on the mid-range coefficient search algorithm. As illustrated in FIG. 4B, C0-C9 are examples of 10 coefficients defined in the linear preset coefficient search discussed above in regard to FIG. 3. In this example, the best four coefficients are identified and are C3, C4, C8, and C9. Of the best four coefficients that are identified, the largest precursor and smallest post-cursor are identified as 11 and 6, respectively, as indicated at 412. Further the largest post-cursor and smallest precursor are identified as 0 and 20, respectively, as indicated at 414.

A line, indicated at 416, is drawn. In some scenarios, this may be referred to as a mid-range line. A set of points coinciding with the mid-range line 416 are selected, as discussed below.

Figure 4C:
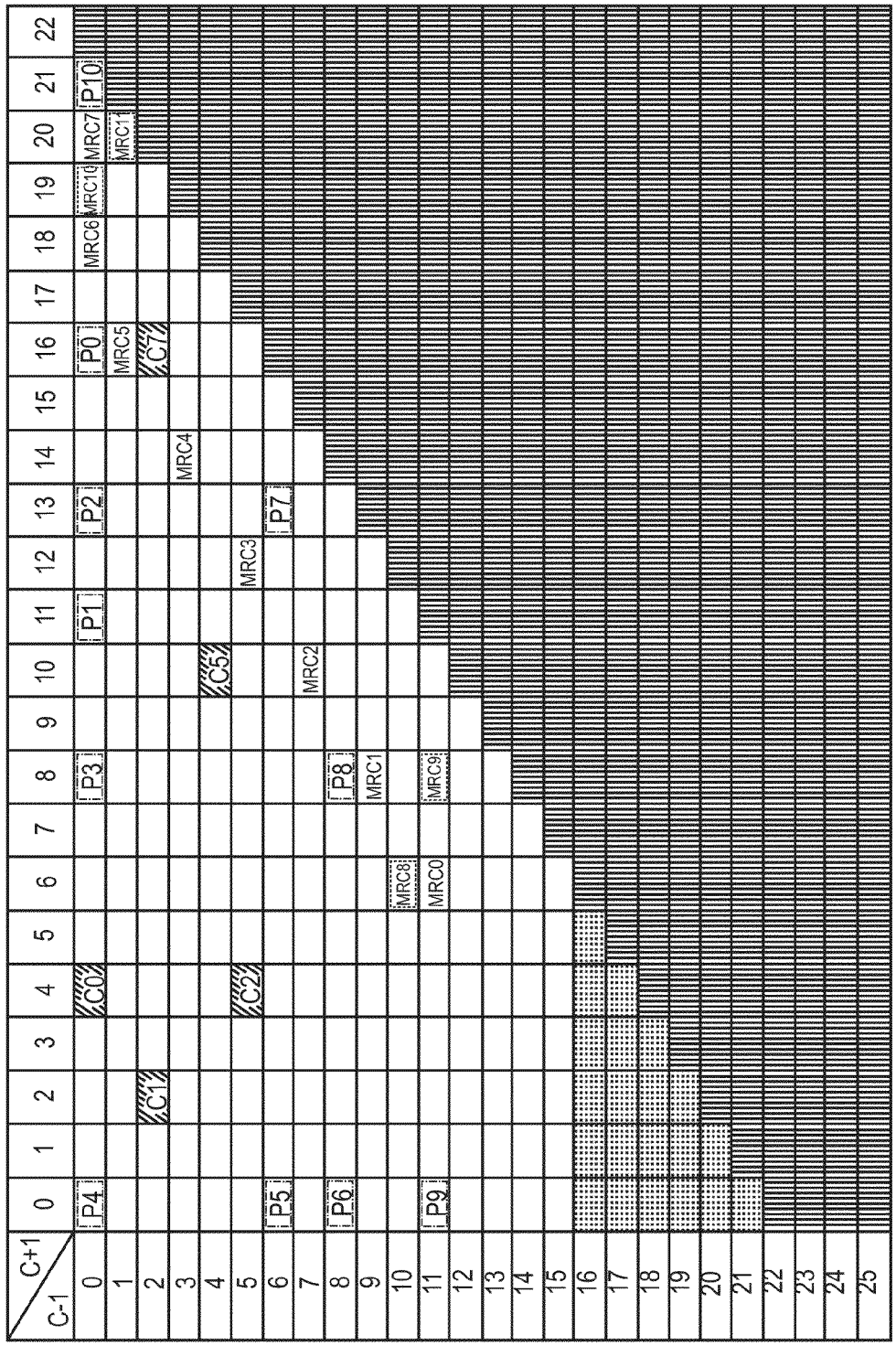
FIG. 4C is a graph illustrating an example of coefficients identified in the mid-range coefficient search algorithm.

FIG. 4C is a graph illustrating an example of coefficients identified in the mid-range coefficient search algorithm. As mentioned above, a set of points coinciding with a mid-range line, such as the mid-range line 416 of FIG. 4B, are selected. In this example, the number of points selected is seven, including mid-range coefficient zero (MRC0) through MRC7.

The seven coefficients may be selected based on an incremental step size, (1/7 delta) between attributes of the points 412 and 414 from FIG. 4. Specifically, a 1/7 delta step size between precursors of points 412 and 414, and a step size of 1/7 delta between post-cursors of both points 412 and 414. Whenever a precursor and/or a post cursor reaches the minimum of precursors in the allowable area, and a maximum of the precursors in the allowable area, the precursors and post-cursors may be capped, as is respectively shown at MRC6 and MRC7.

Signals associated with each of the coefficients MRC0 through MRC7 may be analyzed by an eye height margining mechanism, such as the eye height margining mechanism 110 of FIG. 1. A coefficient having a highest margin value from among all of the signals analyzed may be selected as the finalized preset to use at a transmitting device, such as the transmitter 108.

Figure 5A:
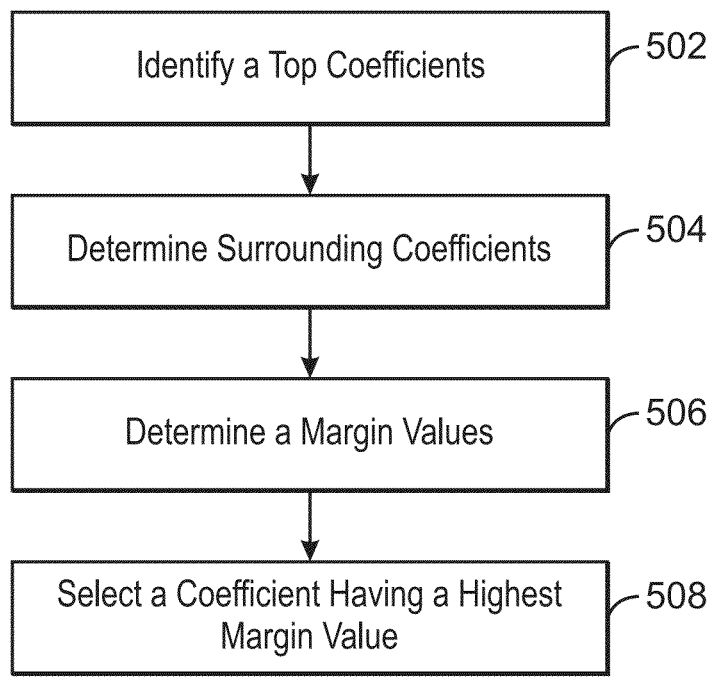
FIG. 5A is a block diagram illustrating a method for determining a coefficient for link equalization based on a nine tile coefficient search algorithm.

FIG. 5A is a block diagram illustrating a method for determining a coefficient for link equalization based on a nine tile coefficient search algorithm. The nine tile coefficient search algorithm may include method steps, such as the method 500 of FIG. 5A. At 502, a top coefficient may be identified. The top coefficient may be the finalized coefficient selected from either the linear presets coefficient search discussed above in regard to FIG. 3, the mid-range coefficient search discussed above in regard to FIG. 4A, or a previous iteration of the nine tile coefficient search discussed herein. The top coefficient identified as a reference point to populate the nine tiles coefficient search.

At block 504, eight coefficients are determined based on a step size away from the reference point. At block 506, margin values for each coefficient are determined, and at block 508, the coefficient having a highest margin value is selected.

Figure 5B:
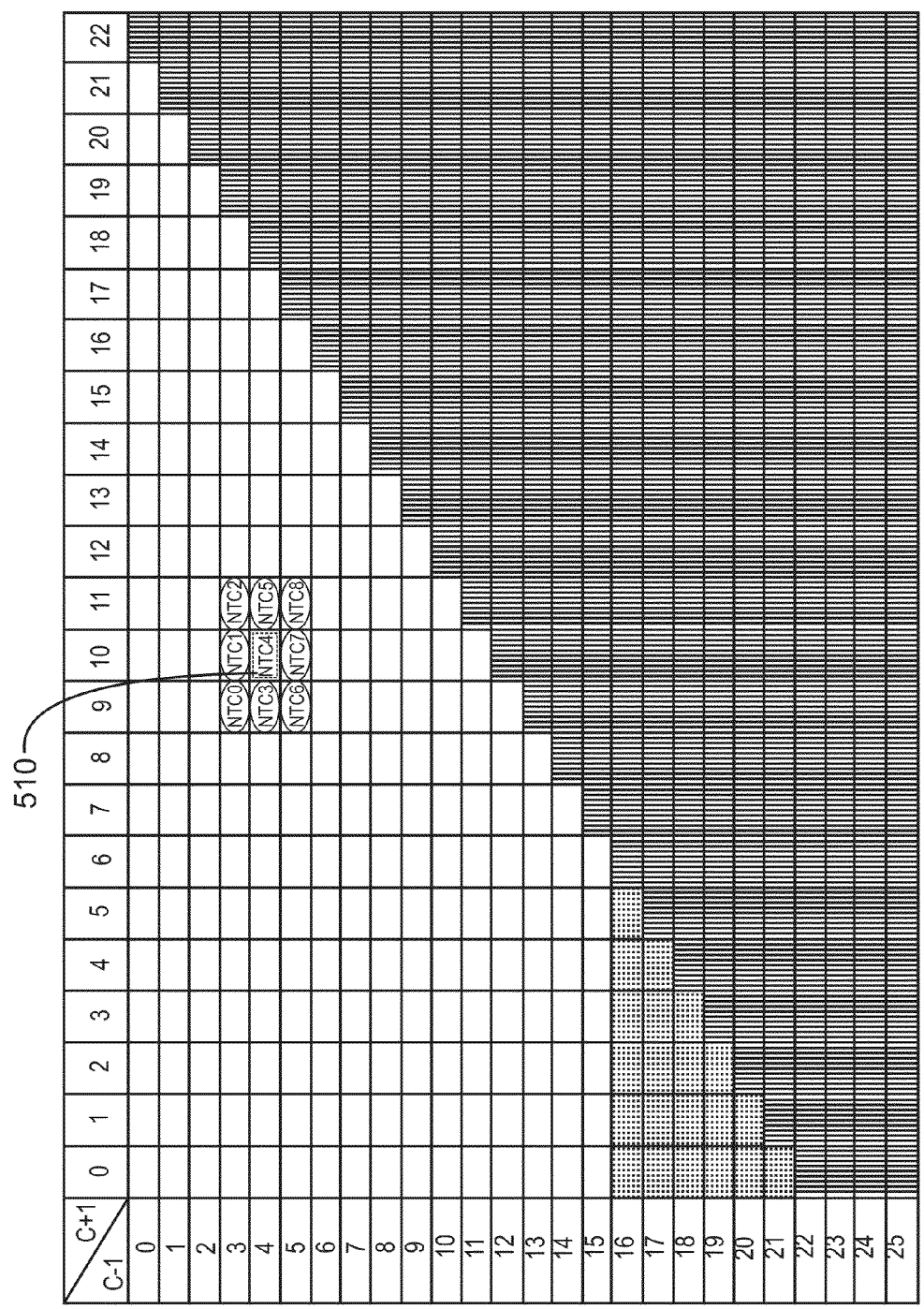
FIG. 5B is a diagram illustrating a graph of the nine tile coefficient search.

FIG. 5B is a diagram illustrating a graph of the nine tile coefficient search. In the graph of FIG. 5B, each tile indicates a coefficient having a post-cursor and a pre-cursor. The nine tile coefficient (NTC4) is associated with a precursor of 4 and a post-cursor of 10, and is identified as the reference point, as indicated at 510. The tiles surrounding the reference point are the coefficients to be evaluated, including the reference point tile.

Figure 5C:
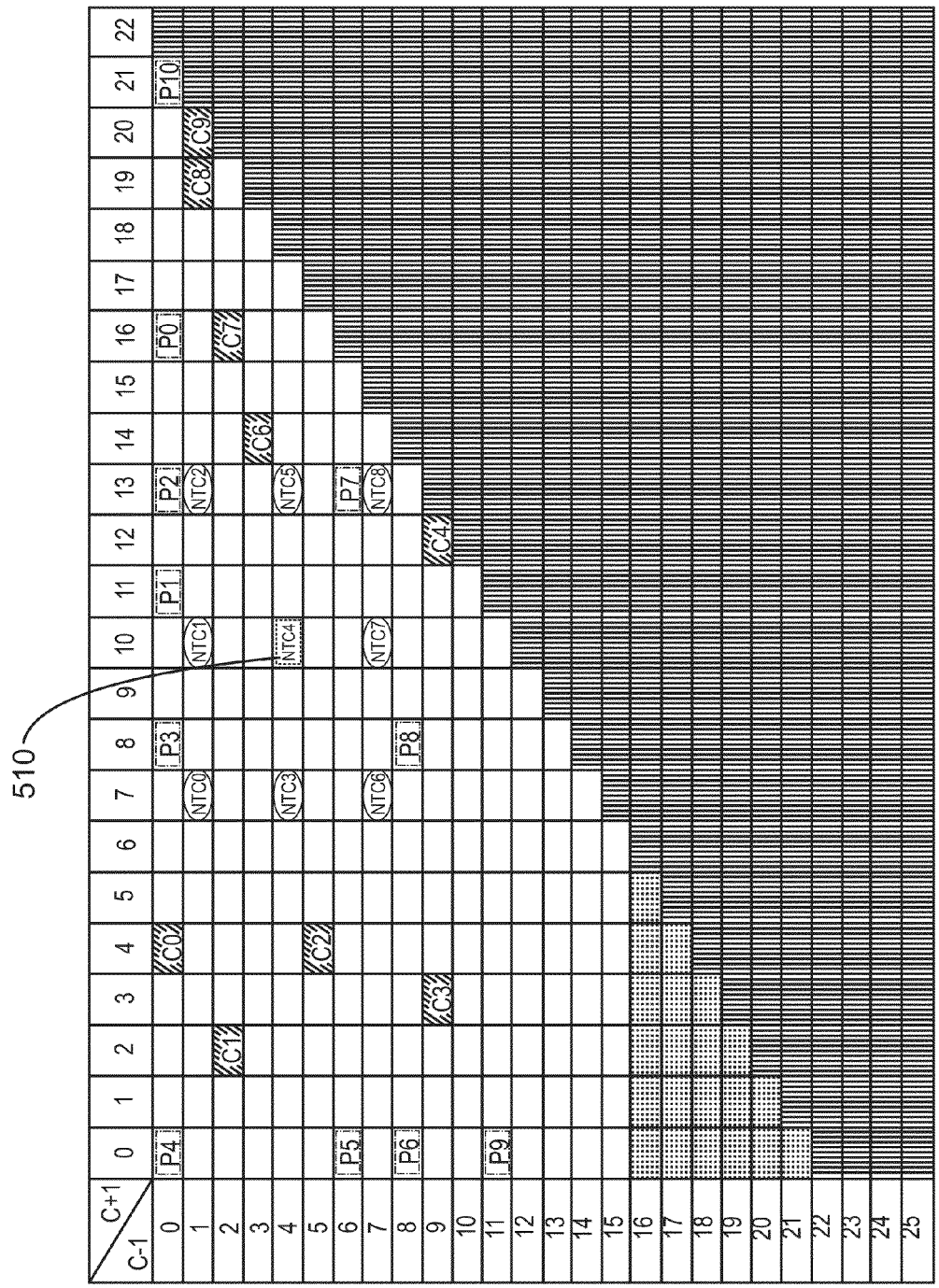
FIG. 5C is a diagram illustrating a graph of the nine tile coefficient search having an increased step size.

FIG. 5C is a diagram illustrating a graph of the nine tile coefficient search having an increased step size. In comparison to FIG. 5B, the coefficients surrounding the reference coefficient 510 are farther away in FIG. 5C than in FIG. 5B. Accordingly, the nine tile coefficient search may be programmable with varying step size.

Figure 5D:
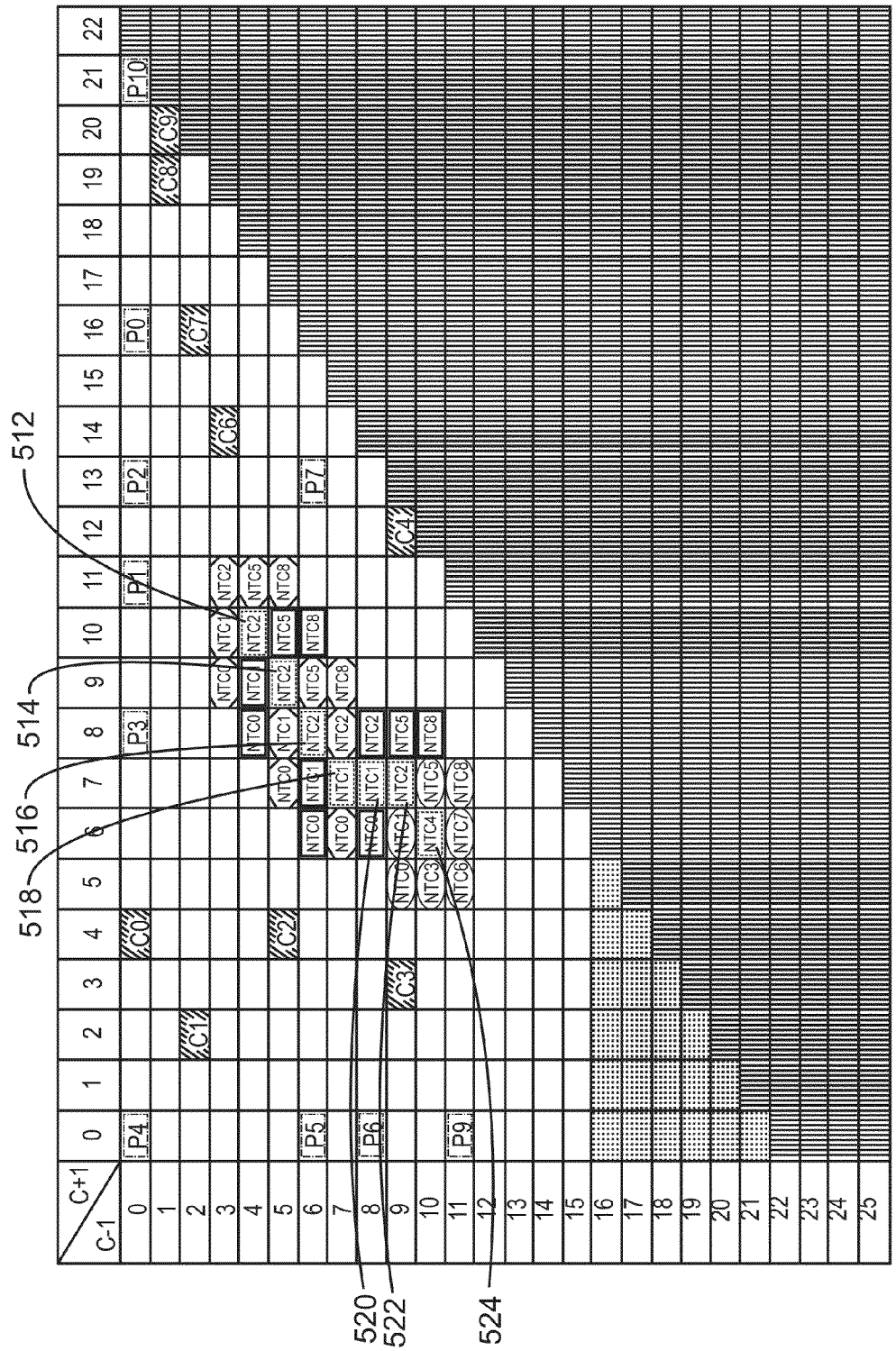
FIG. 5D is a diagram illustrating a graph of the nine tile coefficient search performed over several iterations.

FIG. 5D is a diagram illustrating a graph of the nine tile coefficient search performed over several iterations. In some cases, it may be desirable to perform several iterations of the nine tile coefficient search. In these scenarios, the number of iterations may be programmable by an operator of the system described herein. The first reference point is indicated at 512. Subsequent iterations may use the coefficient having the highest margin value as determined at 506 and 508 of FIG. 5A. In some cases, the reference point may remain in the same during iterations.

In the example illustrated in FIG. 5D, the reference point of the second iteration is indicated at 514. The reference points 514, and the coefficients surrounding the reference point 514, are analyzed for a margin value, and the highest margin coefficient, indicated at 516, is used in the third iteration as a reference point. Subsequent reference points 518, 520, 522, and 524 are likewise used in a seven iteration implementation.

Figure 6A:
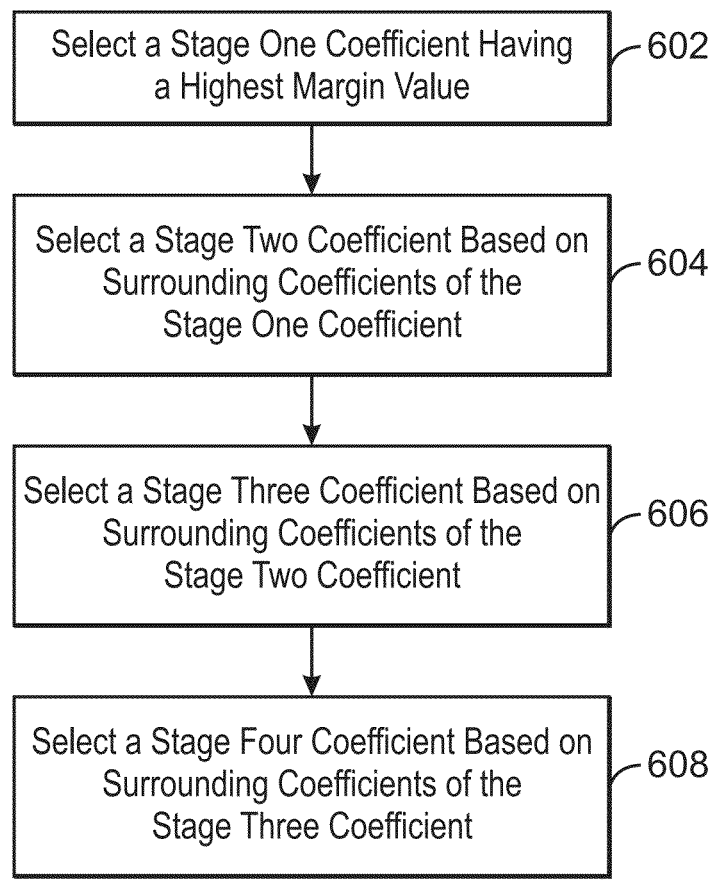
FIG. 6A is a block diagram illustrating a method for determining a coefficient for link equalization based on a grid with surrounding box search.

FIG. 6A is a block diagram illustrating a method for determining a coefficient for link equalization based on a grid with surrounding box search. The grid with surrounding box (GSSB) search may be split up into four stages. In a first stage at block 602, a stage one coefficient having a highest margin value is selected based on a comparison within a set of predefined coefficients having margin values. The predefined coefficients may include a transmitter preset coefficients, as discussed above in regard to FIG. 2, scaled coefficient values, or values given using maximum boost line offset coordinates.

In a second stage at block 604, a stage two coefficient is selected based on eight coefficients surrounding the stage one coefficient. Should no coefficient within the eight surrounding coefficients result in a higher margin value, the search may end, and the stage one coefficient may be used to train the transmitter. Otherwise, the GSSB search may proceed to stage 3.

In a third stage at block 606, iteration will identify coefficients surrounding the stage two coefficient. Further, redundant coefficients will be avoided. For example, some of the coefficients evaluated in stage two may exist in the surrounding coefficients of stage three. The redundancy may, in some cases, be a result of the step size between the referenced coefficient and the surrounding coefficients. By avoiding redundancy in coefficient evaluation, the GSSB search may proceed faster is it searches. Should no coefficient within the surrounding coefficients result in a higher margin value, the search may end, and the stage two coefficient may be used to train the transmitter. Otherwise, the GSSB search may proceed to stage 4.

In a third stage at block 606, another iteration will identify coefficients surrounding the stage three coefficient, while avoiding redundant coefficients will be avoided. Should no coefficient within the surrounding coefficients result in a higher margin value, the search may end, and the stage three coefficient may be used to train the transmitter.

In some scenarios, the first stage at 602 may include more than one reference coefficient. As illustrated in Table 2 below, the number of initial reference points in stage one may affect the number of stages searched in the GSSB search. Table 2 illustrates a limitation given a total of 24 maximum evaluations. This number is arbitrary and could be smaller or larger in an implementation.

TABLE 2

| Max Possible Stage 1 reference coefficients | Stage 2 enabled? | Stage 3 Enabled? | Stage 4 enabled? | Stage 2 +/1 2 step size | Total Searched |
|---|---|---|---|---|---|
| 12 | No | n/a | n/a | n/a | 12 |
| 11 | Yes | No | n/a | No | 19 |
| 11 | Yes | No | n/a | Yes | 19 |
| 10 | Yes | Yes | n/a | No | 21-23 |
| 8 | Yes | Yes | n/a | Yes | 24 |
| 6 | Yes | Yes | Yes | No | 20-24 |
| 3 | Yes | Yes | Yes | Yes | 22-24 |

Figure 6B:
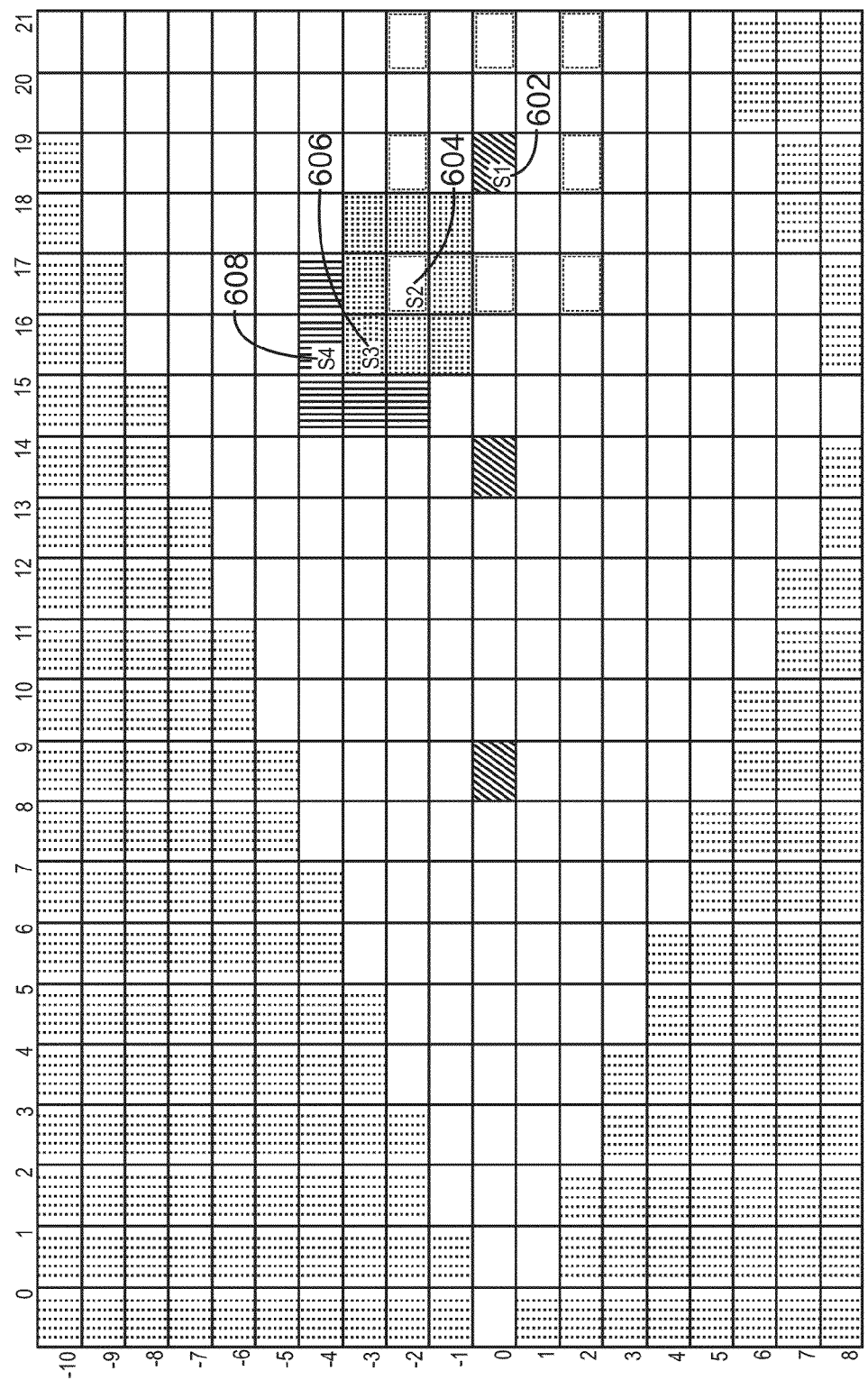
FIG. 6B is a graph illustrating the grid search having surrounding box performed on an example coefficient starting point.

FIG. 6B is a graph illustrating the grid search having surrounding box performed on an example coefficient starting point. At 602, the stage one coefficient is used as a reference point to find the stage two coefficient at 604. In this example, the stage two used a step size of two, while stage one used a step size of 1. The stage two coefficient 604 is used to find the stage three coefficient at 606, and the stage three coefficient is used as a reference point to find the stage four reference point at 608.

In some embodiments, the GSSB search may be paused during each stage such that the GSSB search may span multiple entries into a Recovery.Equalization stage. Each time the GSSB search is paused, the best coefficient selected may be presented to a link partner, such as the transmitter 108 of FIG. 1, via the equalization control module 106. For example, in a PCIe configuration, the coefficient having the highest margin value may be presented to the transmitter 108 in exit of phase 2 to an upstream port (UP) or phase 3 to a downstream port (DP). Re-entry to equalization may be done as soon as possible. For upstream ports, this may not occur if the downstream port blocks and defers the upstream port to software through the PCIe 3 standard specification-defined interrupt. Downstream ports should be able to re-enter Recovery.Equalization anytime so long as higher layer timeouts or error events do not occur as a result.

In embodiments, the GSSB search may follow various definitions. Fractional coefficients are defined as a pair of fraction numerators over 64: one for a post-cursor and one for a precursor related to the fractional coefficient. A final coefficient may be generated by first calculating an initial precursor and post-cursor. Specifically, the initial precursor and post cursor may be found using Equation 6:

$$C_{-1/+1} = \frac{\text{Programmed Numerator}}{64} \times FS \qquad \text{Eq. 6}$$

In Eq. 6, rounding up or down may be performed at a half point. The post-cursor may be adjusted to be within the boundary indicated in Eq. 4 above. Using the adjusted post-cursor, the precursor may be adjusted to be within a boundary indicated in Equation 7 below:

$$C_{+1} = \frac{(FS - LF)}{2} - C_{-1} \qquad \text{Eq. 7)}$$

In Eq. 6, FS indicates a full swing value, while LF indicates an low frequency value as defined by the PCIe 3 standards specification. The coefficient of interest, $C_0$, may be then be derived from the adjusted precursor and post-cursor coefficients as indicated in Equation 8 below:

$$C_0 = FS - C_{-1} - C_{+1} \qquad \text{Eq. 8}$$

In embodiments, boost line based coefficients are defined as points in a coordinate system as illustrated in FIG. 6. The boost line coordinate system is defined as a coefficient space mapped along two axes. One axis may include a boost line based on the total sum of $|C_{-1}|$ and $|C_{+1}|$ coefficient values. Another axis may include a boost line center offset wherein the center is defined by Equation 9 and Equation 10 below:

$$C_{-1} \leq \text{Floor}\left(\frac{\text{Boost Line}}{2}\right) \qquad \text{Eq. 9}$$

$$C_{+1} \leq \text{Ceiling}\left(\frac{\text{Boost Line}}{2}\right) \qquad \text{Eq. 10}$$

A negative offset may indicate that the resultant $C_{+1}$ is greater than the $C_{+1}$ indicated by the boost line, and a positive value means that the $C_{-1}$ is increased from the boost line's center $C_{-1}$. The maximum boost line value is defined by Equation 11:

$$C = \text{Floor}\left(\frac{FS - LF}{2}\right) \qquad \text{Eq. 11}$$

Coefficients may be derived from boost line coordinates by scaling pre-scaled boost line by a received FS, which may be referred to herein as the variable "B." A pre-scaled off-set may be scaled by the received FS, which may be referred to herein as the variable "P." A maximum boost line "M" may be determined by Equation 12:

$$M = \left(\frac{FS - LF}{2}\right) \qquad \text{Eq. 12}$$

In Eq. 12, any non-integer may be rounded down to the nearest integer. A target boost line, "L," may be determined by Equation 13:

$$L = M - B \qquad \text{Eq. 13}$$

A midpoint of the target boost line having coordinates of $E_{-1}$ and $E_{+1}$ is calculated according to Equations 14 and 15:

$$E_{-1} = \left(\frac{L}{2}\right) \qquad \text{Eq. 14}$$

$$E_{+1} = \left(\frac{L}{2}\right) \qquad \text{Eq. 15}$$

In some embodiments, favoritism may be given to a post cursor for odd numbered boost lines. The post-cursor $C_{-1}$ may be calculated from the offset of $E_{-1}$, as indicated by Equation 16, within the limits of Equations 17-19 below:

$$C_{-1} = E_{-1} + P \qquad \text{Eq. 16}$$

$$C_{-1} \leq FS/2 \qquad \text{Eq. 17}$$

$$C_{-1} \leq L \qquad \text{Eq. 18}$$

$$C_{-1} \geq 0 \qquad \text{Eq. 19}$$

Further, precursor $C_{+1}$ may be calculated according to Equation 20, within the limitations of Equations 21-22:

$$C_{+1} = E_{+1} - P \qquad \text{Eq. 20}$$

$$C_{+1} \leq L \qquad \text{Eq. 21}$$

$$C_{+1} > 0 \qquad \text{Eq. 22}$$

Figure 7:
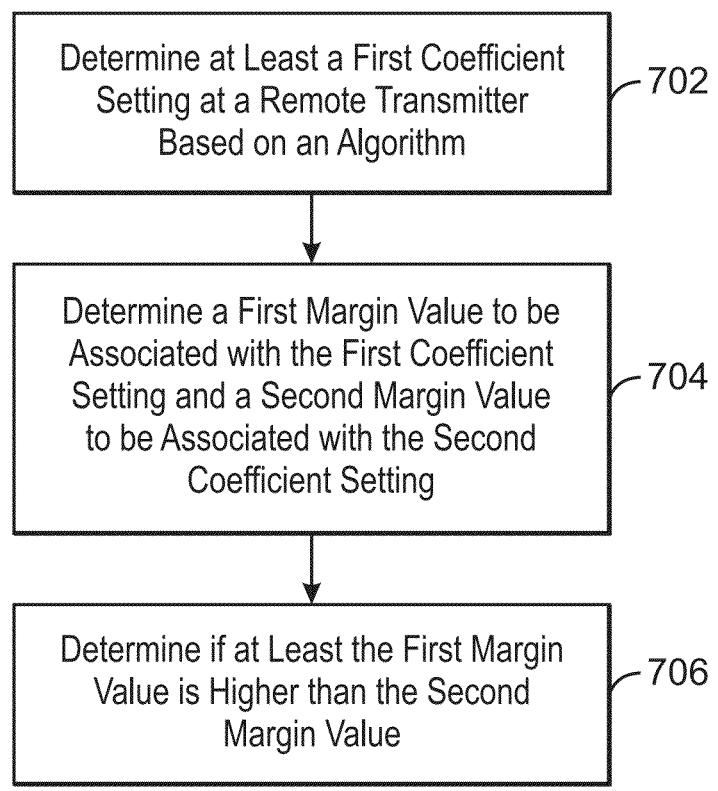
FIG. 7 is a block diagram illustrating a method for link equalization.

FIG. 7 is a block diagram illustrating a method for link equalization. The method 700 may include successively changing a coefficient setting at a remote transmitter based on an algorithm at block 702. At block 704, determining a margin value associated with each successive coefficient setting is followed by identifying a margin value that is highest from among the margin values determined.

Figure 8:
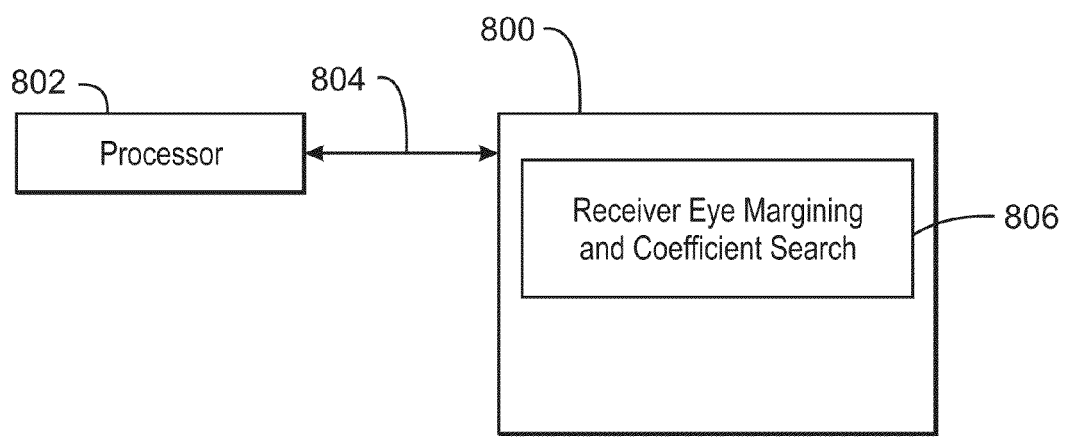
FIG. 8 is a block diagram depicting an example of a computer-readable medium configured for link equalization.

FIG. 8 is a block diagram depicting an example of a computer-readable medium configured for link equalization. The computer-readable medium 800 may be accessed by a processor 800 over a computer bus 804. In some examples, the computer-readable medium 800 may be a non-transitory computer-readable medium. In some examples, the computer-readable medium may be a storage medium, but not including carrier waves, signals, and the like. Furthermore, the computer-readable medium 800 may include computer-executable instructions to direct the processor 802 to perform the steps of the current method.

The various software components discussed herein may be stored on the tangible, non-transitory, computer-readable medium 800, as indicated in FIG. 8. For example, a receiver eye margining and coefficient search application 806 may be configured to determining at least a first coefficient setting and a second coefficient setting at a remote transmitter based on an algorithm, and determine a first margin value to be associated with the first coefficient setting and a second margin value to be associated with the second coefficient setting. The receiver eye margining and coefficient search application 806 may also be configured to determine if at least the first margin value is higher than the second margin value In some cases, the receiver eye margining and coefficient search application 806 may be configured successively change a coefficient setting at a remote transmitter based on an algorithm, and determine a margin value associated with each successive coefficient setting. The margin value that is the highest from among the margin values is determined.

In the description contained herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Example 1 includes an apparatus for link equalization. The apparatus includes an equalization control module to determine at least a first coefficient setting and a second coefficient setting at a remote transmitter based on an algorithm. The apparatus also includes a receiver margining module to determine a first margin value to be associated with the first coefficient setting and a second margin value to be associated with the second coefficient setting. The receiver margining module is to also determine if at least the first margin value is higher than the second margin value.

In some cases, the equalization control module is to successively change a coefficient setting comprising at least the first and second coefficient setting. Further, the receiver margining module is configured to select a coefficient setting to be implemented at the remote transmitter, the selected coefficient setting being associated with a highest margin value.

The receiver margining module may comprise an eye height margining mechanism to increase a voltage offset. The receiver margining module may include a symbol error detector to determine when a bit error rate exceeds a threshold as the voltage offset is increased. Further, the receiver margining module may include a scoreboard engine to identify the margin values as the voltage offset at which the threshold is exceeded for a given coefficient setting.

Example 2 includes a method for link equalization. The method may include determining at least a first coefficient setting and a second coefficient setting at a remote transmitter based on an algorithm. The method may include determining a first margin value to be associated with the first coefficient setting and a second margin value to be associated with the second coefficient setting. The method may include determining if at least the first margin value is higher than the second margin value.

In some cases, the method may include identifying a coefficient setting associated with a highest margin value. The method may also include finalizing the coefficient setting at the remote transmitter based on the coefficient setting associated with the highest margin value.

The algorithm may comprise a linear preset coefficient search wherein at least the first and second coefficients are preset coefficients identified based on lab measurement. The algorithm may comprise a midrange coefficient search wherein at least the first and second coefficients are identified based on four presets having a highest margin value in the linear preset coefficient search. The algorithm may comprise a grid search wherein at least the first and second coefficients are determined based on one or more of a first stage, a second stage, a third stage, a fourth stage, or any combination thereof. The algorithm may comprise a nine tile coefficient search at least the first and second coefficients are among nine coefficients comprising eight coefficients identified based on a step size from a reference coefficient, or any combination of the algorithms discussed herein.

Example 3 includes a system for link equalization. The system includes a transmitter and a receiver communicatively coupled to the transmitter. The receiver includes an equalization control module to determine at least a first coefficient setting and a second coefficient setting at a remote transmitter based on an algorithm, and a receiver margining module. The receiver module is configured to determine a first margin value to be associated with the first coefficient setting and a second margin value to be associated with the second coefficient setting, and determine a first margin value to be associated with the first coefficient setting and a second margin value to be associated with the second coefficient setting.

Example 4 includes an apparatus for link equalization. The apparatus includes a means for equalization control to determine at least a first coefficient setting and a second coefficient setting at a remote transmitter based on an algorithm. The apparatus includes a means for receiver margining. The a means for receiver margining is configured to determine a first margin value to be associated with the first coefficient setting and a second margin value to be associated with the second coefficient setting, and determine if at least the first margin value is higher than the second margin value.

The means for equalization control and the means for receiver margining may be implemented as electronic logic circuits. In some cases, the means may be implemented at software.

Example 5 includes a computer readable medium having code that, when executed by a processing device, cause the processing device to perform operations. The operations include determining at least a first coefficient setting and a second coefficient setting at a remote transmitter based on an algorithm. The operations also include determining a first margin value to be associated with the first coefficient setting and a second margin value to be associated with the second coefficient setting, and determining if at least the first margin value is higher than the second margin value.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for link equalization, comprising:
   an equalization control module to determine at least a first coefficient setting and a second coefficient setting at a remote transmitter based on an algorithm; and
   a receiver margining module to:
      determine a first margin value to be associated with the first coefficient setting and a second margin value to be associated with the second coefficient setting; and
      determine if at least the first margin value is higher than the second margin value.

2. The apparatus of claim 1, wherein:
   the equalization control module is to successively change a coefficient setting comprising at least the first and second coefficient setting; and
   the receiver margining module is to select a coefficient setting to be implemented at the remote transmitter, the selected coefficient setting being associated with a highest margin value.

3. The apparatus of claim 1, the algorithm comprising a linear preset coefficient search wherein at least the first and second coefficients are preset coefficients identified based on lab measurement.

4. The apparatus of claim 3, the algorithm comprising a midrange coefficient search wherein at least the first and second coefficients are identified based on four presets having a highest margin value in the linear preset coefficient search.

5. The apparatus of claim 1, the algorithm comprising a nine tile coefficient search wherein at least the first and second coefficients are among nine coefficients comprising eight coefficients identified based on a step size from a reference coefficient.

6. The apparatus of claim 5, wherein the equalization control module is to iteratively perform the nine tile coefficient search.

7. The apparatus of claim 1, the algorithm comprising a grid search wherein the at least first and second coefficients are determined based on one or more of:
   a first stage wherein a set of coefficients comprising at least the first and second coefficients are evaluated to determine a coefficient having a highest margin value;
   a second stage wherein eight coefficients identified based on a step size from the coefficient determined in the first stage are evaluated to determine a coefficient having a highest margin value;
   a third stage wherein a number of coefficients identified based on a step size from the coefficient determined in the second stage are evaluated to determine a coefficient having a highest margin value;
   a fourth stage wherein a number of coefficients identified based on a step size from the coefficient determined in the third are evaluated to determine a coefficient having a highest margin value.

8. The apparatus of claim 7, wherein coefficients identified in more than one stage are only evaluated in the stage where they were first identified.

9. The apparatus of claim 1, wherein the receiver margining module is integrated on a system on-chip.

10. The apparatus of claim 1, wherein the receiver margining module comprises:
    an eye height margining mechanism to increase a voltage offset;
    a symbol error detector to determine when a bit error rate exceeds a threshold as the voltage offset is increased;
    a scoreboard engine to identify the margin values as the voltage offset at which the threshold is exceeded for a given coefficient setting.

11. A method for link equalization, the method comprising:
    determining at least a first coefficient setting and a second coefficient setting at a remote transmitter based on an algorithm;
    determining a first margin value to be associated with the first coefficient setting and a second margin value to be associated with the second coefficient setting; and
    determining if at least the first margin value is higher than the second margin value.

12. The method of claim 11, further comprising:
    identifying a coefficient setting associated with a highest margin value; and
    finalizing the coefficient setting at the remote transmitter based on the coefficient setting associated with the highest margin value.

13. The method of claim 11, the algorithm comprising a linear preset coefficient search wherein at least the first and second coefficients are preset coefficients identified based on lab measurement.

14. The method of claim 13, the algorithm comprising a midrange coefficient search wherein at least the first and second coefficients are identified based on four presets having a highest margin value in the linear preset coefficient search.

15. The method of claim 11, the algorithm comprising a nine tile coefficient search at least the first and second coefficients are among nine coefficients comprising eight coefficients identified based on a step size from a reference coefficient.

16. The method of claim 15, wherein the equalization control module is to iteratively perform the nine tile coefficient search.

17. The method of claim 11, the algorithm comprising a grid search wherein at least the first and second coefficients are determined based on one or more of:
    a first stage wherein a set of coefficients comprising at least the first and second coefficients are evaluated to determine a coefficient having a highest margin value;
    a second stage wherein eight coefficients identified based on a step size from the coefficient determined in the first stage are evaluated to determine a coefficient having a highest margin value;
    a third stage wherein a number of coefficients identified based on a step size from the coefficient determined in the second stage are evaluated to determine a coefficient having a highest margin value;

a fourth stage wherein a number of coefficients identified based on a step size from the coefficient determined in the third are evaluated to determine a coefficient having a highest margin value.

18. The method of claim 17, wherein coefficients identified in more than one stage are only evaluated in the stage where they were first identified.

19. The method of claim 11, wherein the margin value is determined at a receiver of a transmission link, the method further comprising controlling the remote transmitter via an equalization control module at the receiver.

20. The method of claim 11, wherein determining the margin value comprises:
  increasing a voltage offset;
  determining when a bit error rate exceeds a threshold as the voltage offset is increased;
  identifying the margin values as the voltage offset at which the threshold is exceeded for a given coefficient setting.

21. A system for link equalization, the system comprising:
  a transmitter; and
  a receiver communicatively coupled to the transmitter, the receiver comprising:
    an equalization control module to determine at least a first coefficient setting and a second coefficient setting at a remote transmitter based on an algorithm; and
    a receiver margining module to:
      determine a first margin value to be associated with the first coefficient setting and a second margin value to be associated with the second coefficient setting; and
      determine a first margin value to be associated with the first coefficient setting and a second margin value to be associated with the second coefficient setting.

22. The system of claim 21, wherein:
  the receiver margining module is to identify a coefficient setting from among at least the first and second coefficient settings associated with the highest margin value; and
  the equalization control module is to finalize a coefficient setting at the remote transmitter based on the coefficient setting associated with the highest margin value.

23. The system of claim 21, the algorithm comprising one or more of:
  a linear preset coefficient search at least the first and second coefficients are preset coefficients identified based on lab measurement;
  a midrange coefficient search wherein at least the first and second coefficients are identified based on four presets having a highest margin value in the linear preset coefficient search;
  a nine tile coefficient search wherein at least the first and second coefficients are among nine coefficients comprising eight coefficients identified based on a step size from a reference coefficient.

24. The system of claim 21, the algorithm comprising a grid search wherein the at least first and second coefficients are determined based on one or more of:
  a first stage wherein a set of coefficients comprising at least the first and second coefficients are evaluated to determine a coefficient having a highest margin value;
  a second stage wherein eight coefficients identified based on a step size from the coefficient determined in the first stage are evaluated to determine a coefficient having a highest margin value;
  a third stage wherein a number of coefficients identified based on a step size from the coefficient determined in the second stage are evaluated to determine a coefficient having a highest margin value;
  a fourth stage wherein a number of coefficients identified based on a step size from the coefficient determined in the third are evaluated to determine a coefficient having a highest margin value.

25. The system of claim 21, wherein the receiver margining module comprises:
  an eye height margining mechanism to increase a voltage offset;
  a symbol error detector to determine when a bit error rate exceeds a threshold as the voltage offset is increased;
  a scoreboard engine to identify the margin values as the voltage offset at which the threshold is exceeded for a given coefficient setting.

* * * * *